(12) United States Patent
Ewing

(10) Patent No.: US 10,452,415 B2
(45) Date of Patent: Oct. 22, 2019

(54) ABSTRACTION OF BACKTRACKING

(71) Applicant: International Business Machines Corporation, Armonk, NY (US)

(72) Inventor: Douglas C. Ewing, Fairport, NY (US)

(73) Assignee: International Business Machines Corporation, Armonk, NY (US)

( * ) Notice: Subject to any disclaimer, the term of this patent is extended or adjusted under 35 U.S.C. 154(b) by 1271 days.

(21) Appl. No.: 14/496,230

(22) Filed: Sep. 25, 2014

(65) Prior Publication Data

US 2016/0092249 A1  Mar. 31, 2016

(51) Int. Cl.
- *G06F 9/455* (2018.01)
- *G06F 8/30* (2018.01)
- *G06F 8/41* (2018.01)

(52) U.S. Cl.
CPC ......... *G06F 9/45508* (2013.01); *G06F 8/313* (2013.01); *G06F 8/41* (2013.01)

(58) Field of Classification Search
CPC .................................................. G06F 9/45508
See application file for complete search history.

(56) References Cited

U.S. PATENT DOCUMENTS

| 5,136,698 A | 8/1992 | Okamoto |
| 6,157,922 A | 12/2000 | Vaughan |
| 6,446,057 B1 | 9/2002 | Vaughan |
| 7,174,481 B1 | 2/2007 | Di Fabbrizio et al. |
| 2010/0115490 A1* | 5/2010 | Wilcock .................. G06F 8/10 717/104 |

OTHER PUBLICATIONS

Chun, Hon Wai. "Constraint programming in Java with JSolver." Proc. practical applications of constraint logic programming, PACLP99. 1999.*

Wolf, Armin. "Adaptive constraint handling with CHR in Java." Principles and Practice of Constraint Programming—CP 2001. Springer Berlin/Heidelberg, 2001.*

* cited by examiner

*Primary Examiner* — Scott A. Waldron
*Assistant Examiner* — Kevin W Figueroa
(74) *Attorney, Agent, or Firm* — Brian J. Colandrea, Esq.; Jeffrey T. Placker, Esq.; Holland & Knight LLP

(57) ABSTRACT

A computer-implemented method, computer program product, and computing system is provided for providing a framework for logically representing the discretization of logic for a backtracking algorithm. In an implementation, a method may include defining a validation class representing a validation logic to be tested. A processable class may be defined representing a backtracking logic flow to be implemented. The processable class may be associated with the validation class. One or more candidate options may be evaluated based upon, at least in part, the validation logic and the backtracking logic flow.

14 Claims, 12 Drawing Sheets

ABSTRACTION OF BACKTRACKING

TECHNICAL FIELD

The present disclosure generally relates to systems and method for backtracking-based searching, and more particularly relates to a framework for discretization of logic for backtracking-based searching.

BACKGROUND

Many expert system problems, for example in the configuration-space, may require the use of a complex algorithm to help find solutions. Typical algorithms used to find solutions may often be either state-based algorithms, such as Rete algorithms, or backtracking-based algorithms. Each type of algorithm may have its advantages and disadvantages. For example, state-based algorithms may often tend to be heavy consumers of both memory and time for large systems. For this reason, backtracking-based algorithms may be considered to be better suited for solution finding within large systems.

Backtracking allows solutions to configuration space problems to be found by enumerating candidates at various choice points while building a system. As each choice is made in pursuit of a goal, a 'search tree' is formed. A new branch in the tree is created if a failure state is encountered and a previously chosen candidate is thrown away in favor of a new candidate. Not all candidates need to necessarily be evaluated to find a valid solution.

SUMMARY OF DISCLOSURE

According to an implementation, a computer-implemented method may include defining, by a processor, a validation class representing a validation logic to be tested. The method may also include defining, by the processor, a processable class representing a backtracking logic flow to be implemented. The method may also include associating, by the processor, the processable class with the validation class. The method may further include evaluating, by the processor, one or more candidate options based upon, at least in part, the validation logic and the backtracking logic flow.

One or more of the following features may be included. Defining the validation class may include defining the validation class using syntax and libraries of a standard programming language. The validation class may include one of stateless and stateful. Defining the processable class may include defining the processable class using syntax and libraries of a standard programming language.

The backtracking logic flow may include one or more of a conjunction logic flow, a disjunction logic flow, a scoped disjunction logic flow, a branch and bound backtracking logic flow, and/or other backtracking logic flows. The processable class may define logic for managing state changes during execution of the backtracking algorithm.

Associating the processable class with the validation class may include dynamically associating the processable class with the validation class at runtime. Associating the processable class with the validation class may include selecting the processable class from a plurality of processable classes, the plurality of processable classes representing a plurality of backtracking logic flows. The method may also include executing logic referencing a processable child one of prior to executing logic against the processable child and after executing logic against the processable child, the logic defined against the validation class. The logic to select, initialize, and post process a processable child may be written, or encapsulated, on a single validation class.

According to another implementation, a computer program product may include a computer readable storage medium having a plurality of instructions stored on it. When executed by a processor, the instructions may cause the processor to perform operations including defining a validation class representing a validation logic to be tested. Instructions may also be included for defining a processable class representing a backtracking logic flow to be implemented. Instructions may also be included for associating the processable class with the validation class. Instructions may further be included for evaluating one or more candidate options based upon, at least in part, the validation logic and the backtracking logic flow.

One or more of the following features may be included. Defining the validation class may include defining the validation class using syntax and libraries of a standard programming language. Defining the processable class may include defining the processable class using syntax and libraries of a standard programming language.

The backtracking logic flow may include one or more of a conjunction logic flow, a disjunction logic flow, a scoped disjunction logic flow, a branch and bound backtracking logic flow, and/or other backtracking logic flows. The processable class may define logic for managing state changes during execution of the backtracking algorithm.

Associating the processable class with the validation class may include dynamically associating the processable class with the validation class at runtime. Associating the processable class with the validation class may include selecting the processable class from a plurality of processable classes, the plurality of processable classes representing a plurality of backtracking logic flows. Instructions may also be included for executing logic referencing a processable child one of prior to executing logic against the processable child and after executing logic against the processable child, the logic defined against the validation class. The logic to select, initialize, and post process a processable child may be written, or encapsulated, on a single validation class.

According to yet another implementation, a computing system may include a processor and a memory module coupled with the processor. The processor may be configured for defining a validation class representing a validation logic to be tested. The processor may also be configured for defining a processable class representing a backtracking logic flow to be implemented. The processor may also be configured for associating the processable class with the validation class. The processor may further be configured for evaluating one or more candidate options based upon, at least in part, the validation logic and the backtracking logic flow.

One or more of the following features may be included. Defining the validation class may include defining the validation class using syntax and libraries of a standard programming language. Defining the processable class includes defining the processable class using syntax and libraries of a standard programming language.

The backtracking logic flow may include one or more of a conjunction logic flow, a disjunction logic flow, a scoped disjunction logic flow, a branch and bound backtracking logic flow, and/or other backtracking logic flows. The processable class may define logic for managing state changes during execution of the backtracking algorithm.

Associating the processable class with the validation class may include dynamically associating the processable class with the validation class at runtime. The processor may further be configured for executing logic referencing a processable child one of prior to executing logic against the processable child and after executing logic against the processable child, the logic defined against the validation class. The logic to select, initialize, and post process a processable child may be written, or encapsulated, on a single validation class.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
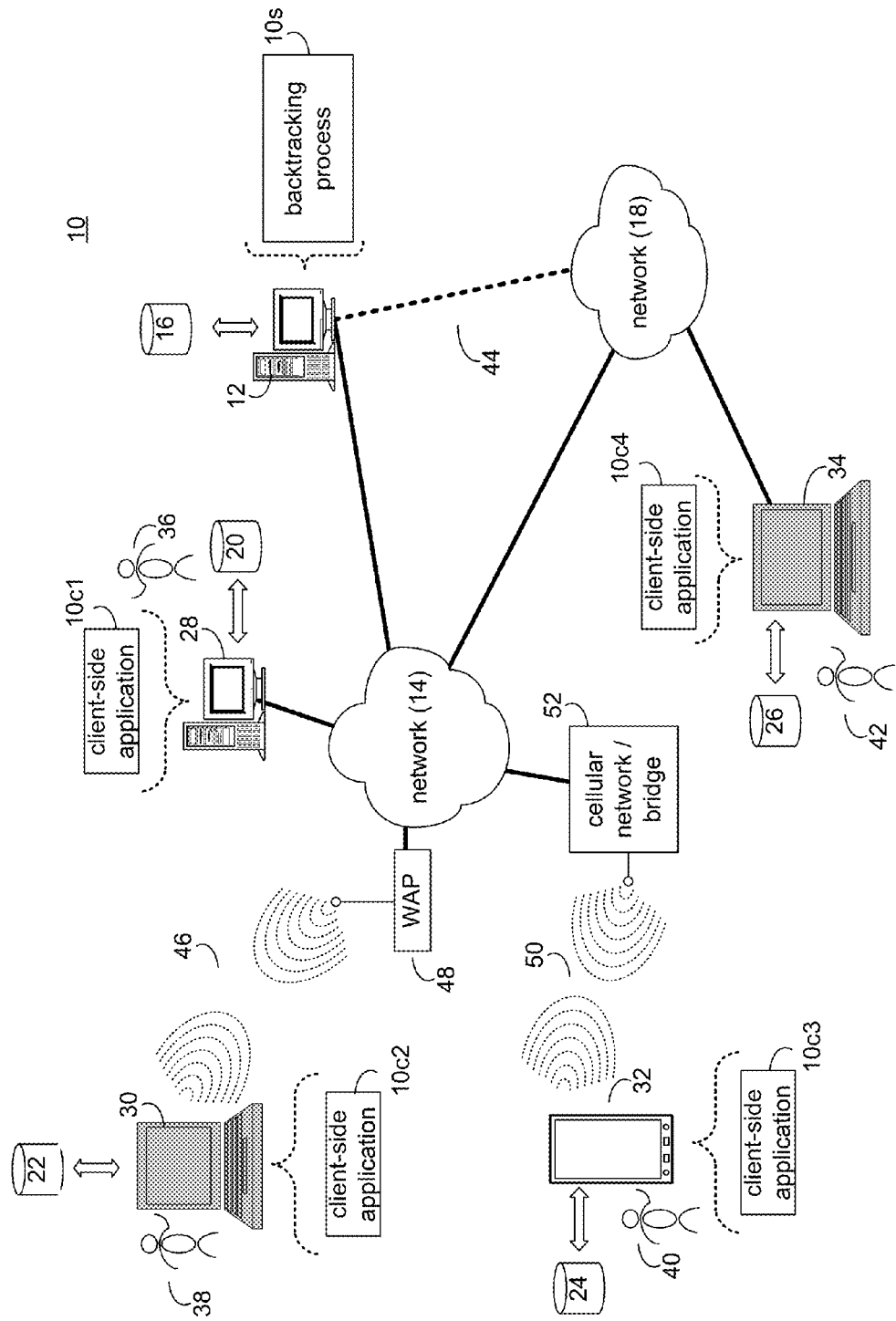
FIG. 1 is a diagrammatic view of a distributed computing network including a computing device that executes a backtracking process according to an implementation of the present disclosure.

Backtracking algorithms are often used to find a suitable solution amongst a multitude of possible solution candidates. For example, in the configuration space, systems such as servers or the like, may be configured having various different components and/or attributes that must be capable of functioning together within the overall system. Consistent with the present disclosure sets of classes may be provided that may abstract the backtracking algorithm within a standard programming language (such as Java, C++, etc.) suitable for use in solution finding applications within the configuration space, and/or other implementations.

In some embodiments, Validation classes (also referred to herein as a "Validation") and Processable classes (also referred to herein as a "Processable") may be defined within a standard programming language for abstracting a backtracking algorithm. In an implementation, the Validation class and the Processable class may discretize the logic for the backtracking algorithm. As such, the logic associated with the backtracking algorithm, which may be discretized via the Validation class and the Processable class, may be written using all syntax and libraries of a standard programming language. A Validation and a Processable may be coupled at runtime to implement the evaluation of candidate selections using a desired backtracking flow. For example, in an embodiment, the Processable class may wrap the Validation class to facilitate execution of the backtracking analysis.

In an embodiment, the Processable class may control the logical flow of the backtracking algorithm, and may determine the type of backtracking to be implemented for the backtracking analysis (e.g., conjunction, disjunction, scoped disjunction, branch and bound disjunction, and/or other backtracking logic). During execution of the backtracking algorithm, the Processable may sit on the programming stack and may retain state changes that may be made via the wrapped Validation class. Further the Processable class may push and pop Processable children with regard to the programming stack. Further, in some implementations, the Processable may return a Boolean value regarding the validation logic associated with the Validation class. For example, the Boolean value may indicate a success or failure of a given candidate with regard to the validation logic implemented by the Validation class.

In an embodiment, the Validation class may represent the validation logic to be tested by the backtracking algorithm. For example, the Validation class may define the logic that may determine if a given candidate pass or fails (e.g., whether or not the candidate is acceptable or satisfies the requirements). In an embodiment, the Validation class may not be required to retain state changes that may be made via the Validation class. Further, in some embodiments, the Validation class may refer to a type of Processable class that may wrap the Validation class.

As generally mentioned above, in an embodiment, both the Processable class and the Validation class may be specified using standard syntax and/or libraries of a general programming language (e.g., a programming language that is not specific for writing backtracking analysis). For example, the Processable class and the Validation class may be specified using Java, C++, or another suitable general programming language. In some implementations, the ability to execute a backtracking algorithm in a standard programming language may be made possible via the abstraction of the algorithm into the two classes, namely the Validation class and the Processable class.

According to an embodiment, the separation of the validation logic and the back tracking logic may make it possible that the Validation class does not retain state changes. As such, and because validation logic may be embodied in the Validation class and the Processable class controls the logical flow of the backtracking algorithm, programmers may not need to be explicitly cognizant of the recursive nature of the backtracking algorithm as they code their validation logic. Accordingly, the addition of new functionality may be intelligently and seamlessly meshed with the existing validation logic in such a manner that it may not confuse and/or break the existing backtracking algorithm, e.g., as the backtracking logic flow may be implemented via the Processable class.

As generally discussed above, a backtracking algorithm may be implemented through the pairing of a Processable class and a Validation class. In an embodiment, the Validation may be queried at run time to determine which Processable class the Validation class should be paired with for a given situation. In an embodiment, the pairing between the Validation and the Processable may be dynamic, enabling runtime determination of the abstracted backtracking program control flow (e.g., disjunction vs. branch and bound disjunction). The dynamic pairing of the Validation class and the Processable class may enable, for example, the choice between best performance (e.g., first valid solution) vs. optimal solution to be made at runtime.

In an embodiment, stack frames for each method called in a recursion during a backtracking analysis may be saved in memory via the standard programming language used. The stack frames may include the state of local variables of any recursively called methods. In some implementations, only the local state of the methods used to control the backtracking algorithm itself may need to be saved. For example, the logic, as written by developers and that is being solved by the backtracking process, may not need to have the state of local variables saved by the Validation class. Runtime memory may be conserved since unnecessary state changes, as made locally within the scope of a Validation, may not be saved. As such, the packet coupling of the Validation class and the Processable class may facilitate the abstraction of backtracking logic via Processable objects that wrapper Validation objects and that may manage saving reference to state changes and unrolling of the state changes upon backtracking/failure. In some embodiments, it may also be ensured that the execution stack of the application is not exceeded due to recursion. Various additional and/or alternative features may be implemented consistent with the present disclosure.

Referring to FIG. 1, there is shown backtracking process 10. For the following discussion, it is intended to be understood that backtracking process 10 may be implemented in a variety of ways. For example, backtracking process 10 may be implemented as a server-side process, a client-side process, or a server-side/client-side process.

For example, backtracking process 10 may be implemented as a purely server-side process via backtracking process 10s. Alternatively, backtracking process 10 may be implemented as a purely client-side process via one or more of client-side application 10c1, client-side application 10c2, client-side application 10c3, and client-side application 10c4. Alternatively still, backtracking process 10 may be implemented as a server-side/client-side process via server-side backtracking process 10s in combination with one or more of client-side application 10c1, client-side application 10c2, client-side application 10c3, and client-side application 10c4. In such an example, at least a portion of the functionality of backtracking process 10 may be performed by backtracking process 10s and at least a portion of the functionality of backtracking process 10 may be performed by one or more of client-side application 10c1, 10c2, 10c3, and 10c3.

Accordingly, backtracking process 10 as used in this disclosure may include any combination of backtracking process 10s, client-side application 10c1, client-side application 10c2, client-side application 10c3, and client-side application 10c4.

Figure 2:
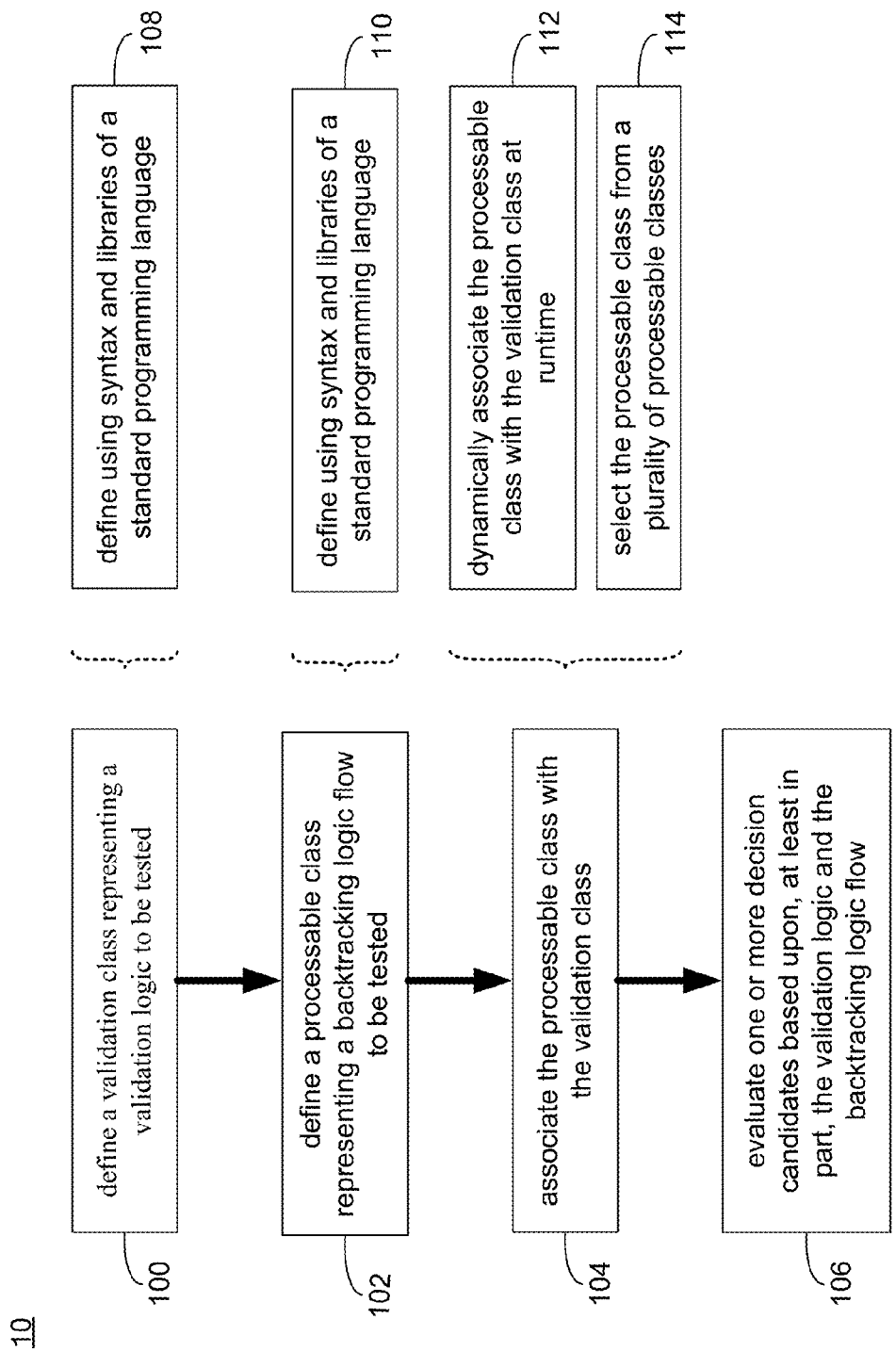
FIG. 2 is a flowchart of the backtracking process of FIG. 1, according to an implementation of the present disclosure.

Referring also to FIG. 2, and as will be discussed in greater detail below, backtracking process 10 may define 100 a Validation class representing a validation logic to be tested. Backtracking process 10 may also define 102 a Processable class representing a backtracking logic flow to be implemented. Backtracking process 10 may also associate 104 the Processable class with the Validation class. Backtracking process 10 may further evaluate 106 one or more candidate options based upon, at least in part, the validation logic and the backtracking logic flow.

Backtracking process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of backtracking process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to, one or more of a voice-over-IP application, a video-over-IP application, a web browser, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access backtracking process 10 directly through network 14 or through secondary network 18. Further, backtracking process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 46 established between laptop computer 30 and wireless access point (WAP) 48. Similarly, mobile computing device 32 is shown wirelessly coupled to network 14 via wireless communication channel 50 established between mobile computing device 32 and cellular network/bridge 52, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Additionally, personal computer 34 is shown directly coupled to network 18 via a hardwired network connection.

As generally discussed above, a portion and/or all of the functionality of backtracking process 10 may be provided by one or more of client side applications 10c1-10c4. For example, in some embodiments backtracking process 10 (and/or client-side functionality of backtracking process 10) may be included within and/or interactive with client-side applications 10c1-10c4, which may include client side electronic communication applications, web browsers, or another application. Various additional/alternative configurations may be equally utilized.

As generally discussed above with reference to FIG. 2, backtracking process 10 may define 100 a Validation class representing a validation logic to be tested. Backtracking process 10 may also define 102 a Processable class representing a backtracking logic flow to be implemented. Backtracking process 10 may also associate 104 the Processable class with the Validation class. Backtracking process 10 may further evaluate 106 one or more candidate options based upon, at least in part, the validation logic and the backtracking logic flow.

Embodiments of backtracking process 10 may be utilized in connection with expert system problems, for example in the configuration space, in which multiple candidate options must be evaluated to identify one or more valid solutions. Often valid solutions may include many layers of valid candidates, e.g., in which earlier selections may impact the nature of downstream options, or even downstream choices that must be made. Backtracking process 10 may facilitate recursive searching through various candidate options to identify valid solutions options, if any, among the candidate options.

For example, in the configuration of a system, such as a server system or the like, candidate options may be enumerated at various choice points. Example of candidate options at a choice point may include, for example, choices of values for a characteristic, choices of a part to satisfy a resource request (e.g., different hardware options, such as hard drive types or configurations, capable of satisfying a design requirement), or other choices of options that may be made. At a given choice point the enumerated candidate options may be evaluated to determine if a candidate option provides a valid solution that satisfies the design requirement, is compatible with prior configuration choices that have already been made, etc. If a selected candidate option fails (e.g., does not satisfy the design requirement and/or is not compatible with prior configuration choices) the selected candidate may be discarded and a new candidate may be selected for evaluation. In some embodiments it may not be necessary to evaluate all possible candidates at a decision point. For example, a first candidate identified as a valid solution may be selected, and the configuration may move forward. In other embodiments, an optimum solution (e.g., based upon one or more addition criteria and/or based upon a comparison of valid solutions) may be identified.

Due, at least in part, to the recursive nature of the search, backtracking may have the potential to become cumbersome. Embodiments of backtracking process 10 may abstract the backtracking algorithm with a set of classes within a standard programming language. In some such embodiments, the logic for evaluating the candidate options may be separated from the logic for managing backtracking in the event of a failed candidate option (e.g., discarding the failed candidate and selecting a new candidate to evaluate). Abstracting the backtracking algorithm in this manner may, for example, allow the logic for evaluating candidate options to be written without requiring knowledge of, and/or without implicating the logic for managing the backtracking. In some embodiments, this abstraction may allow new functionality to be added and meshed with existing logic such that it does not confuse or break the existing backtracking algorithm. Further, in some embodiments, abstracting the backtracking algorithm in the foregoing manner may allow different backtracking logic to be implemented in connection with a given choice point while continuing to implement the same logic for evaluating the validity of the candidate options. In this disclosure the logic for evaluating the candidate options and the logic for managing backtracking may be referred to as classes within a standard programming language. However, it will be appreciated that the manner in which the logic for evaluating the candidate options and the logic for managing backtracking may be defined as constructs within a standard programming language other than "classes." For example, in an embodiment in which the standard programming language is Java, the "validation class" may be a validation interface, and the "processable class" may be a processable interface. Other implementations may be equally utilized.

As generally described above, backtracking process 10 may define 100 a Validation class representing a validation logic to be tested. For example, a backtracking search algorithm provided by backtracking process 10 may allow candidate options to be identified at various search points. Each of the candidate options may represent a possible solution to the problem being solved (e.g., such as a permissible system configuration including various desired attributes). The Validation class may represent the validation logic to be tested—i.e., the logic by which a candidate option may be evaluated to determine whether or not the candidate option is a valid, permissible solution to the problem being solved (e.g., which may include a subset or component of the problem being solved at a given choice point). In an embodiment, the Validation class may implement one or more predefined hooks that may, in part, return a Boolean value of true if the logic is successful (i.e., if the candidate option being evaluated is a valid solution, and return a Boolean value of false if the logic fails).

Defining 100 the Validation class may include defining 108 the Validation class using syntax and libraries of a standard programming language. For example, the Validation class may be defined using a standard programming language such as Java, C++, or any other suitable programming language. As such, programmers may utilize all of the method/class/interface libraries provided by the standard programming language.

Backtracking process 10 may also define 102 a Processable class representing a backtracking logic flow to be implemented. That is, the Processable class may represent the logic flow that may be utilized, at least in part, for getting candidate options to be evaluated and for discarding failed candidates and selecting a new candidate to be evaluated. The backtracking logic flow may include one or more of a conjunction logic flow, a disjunction logic flow, a scoped disjunction logic flow, and a branch and bound disjunction. Accordingly, a backtracking search algorithm may evaluate candidate options and may backtrack through selected option (e.g., in the event of a validation failure of one or more candidate options) by undoing earlier selections according to the backtracking logic flow defined by the Processable class. Various additional and/or alternative backtracking logic may equally be implemented. As such, it may be possible for developers to extend the logic of the Processable class.

As part of the logic representing the backtracking logic flow to be implemented, the Processable class may define logic for managing state changes during execution of the backtracking algorithm. For example, state changes may occur during the execution validation logic. In the event that the Validation of a candidate option fails, it may be necessary to unroll the state changes resulting from the execution of the validation logic in order to discard the failed candidate option. Unrolling the state changes may allow the system to return to a state of the system as it existed prior to the selection of the failed candidate option. Once the state changes associated with the failed candidate option have been unrolled, a new candidate option may be selected and evaluated consistent with the validation logic. The instance of the Processable class may save references to the state changes that occur during execution of the validation logic, and may unroll the state changes in the event of a validation failure of a candidate option. In an implementation, memory consumption may be reduced and/or performance may be improved by only saving state changes that are considered to be backtrackable—e.g., which may be unrolled to return to the state of the system prior to selection of the failed candidate option. Accordingly, changes to local variables when executing logic against a Validation object may not be saved, e.g., by either the Processable representing the backtracking logic flow (e.g., via a Processable stack), or by the frame stack of the standard programming language through which the backtracking search algorithm is implemented.

In a similar manner as defining the Validation class, defining 102 the Processable class may include defining 110 the Processable class using syntax and libraries of a standard programming language. The Processable class may be defined using a standard programming language such as Java, C++, or any other suitable programming language. As such, programmers may utilize all of the method/class/interface libraries provided by the standard programming language.

Backtracking process 10 may also associate 104 the Processable class with the Validation class. Associating 104 the Processable class with the Validation class (e.g., which may include associating a Processable object with a Validation object) may provide a packet including the logic to evaluate candidate options and logic for backtracking and/or unrolling a selection of a candidate option, e.g., in the event of a validation failure of the candidate option. Accordingly, the packet coupling of the Validation object and the Processable object may facilitate the abstraction of backtracking logic for the backtracking search algorithms provided by backtracking process 10 via the Processable object that wrappers the Validation object. It will be appreciated that each choice point may include a discrete Validation-Processable packet.

Associating 104 the Processable class with the Validation class may include dynamically associating 112 the Processable class with the Validation class at runtime. For example, during execution of the backtracking search algorithm provided by backtracking process 10, the Validation class may be queried, and a desired Processable class may be selected. The selected Processable class may wrap the Validation to provide the desired backtracking logic flow. Associating 104 the Processable class with the Validation class may include selecting 114 the Processable class from a plurality of Processable classes, the plurality of Processable classes representing a plurality of backtracking logic flows. Selecting the Processable class form a plurality of Processable classes at runtime may allow switch between different backtracking behaviors while using the same validation logic. For example, in one execution a regular disjunction backtracking logic flow may be implemented (e.g., via the selection of a corresponding Processable class). In another execution of the backtracking search algorithm, a scoped backtracking disjunction logic flow may be implemented (e.g., via the selection of a corresponding Processable class during the execution of the backtracking search algorithm). Accordingly, the decoupling of the validation logic and the backtracking logic may allow the implementation of different backtracking logic flows in connection with the same validation logic. Therefore, the backtracking behavior can be modified without modifying the logic for determining a success or failure of a candidate option.

Backtracking process 10 may further evaluate 106 one or more candidate options based upon, at least in part, the validation logic and the backtracking logic flow. As generally discussed above, the Validation class may represent the logic for testing each candidate option to determine if it is a successful option or not (e.g., provides and possible or acceptable outcome or option), and the Processable class may represent the backtracking logic to be implemented, e.g., conjunctive, disjunctive, etc., and for managing state changes made via the Validation wrapped by the Processable, and unrolling such state changes in the event of a failed validation. Different Validation instances may be utilized in connection with evaluating candidate options for different choice points. Further, the backtracking logic flow of the different choice points may be managed by different Processable instances. As described above, a Validation class (and/or an Validation instance of the Validation class) may be associated different Processable classes (and/or different Processable instances of the Processable class). In some embodiments, the Processable may be dynamically associated with the Validation at runtime.

Backtracking process 10 may utilize a Processable stack that may manage unprocessed, conjunctive Processable objects in a single branch of a search tree. The Processable stack may also manage state changes that cannot be managed using the standard programming language's execution stack, and the Processable stack may also manage unrolling of such state changes. In some embodiments, backtracking process 10 may utilize the execution stack of the standard programming language to manage the candidate options that have already been tried (i.e., the candidate options that have already been tested via the validation logic of the Validation class) and the remaining candidate options that have not yet been tested. The execution stack of the standard programming language may also be utilized to manage rebuilding to-be-processed conjunctive Processable logic (e.g., by pushing onto the Processable stack). Further, the execution stack of the standard programming language may be utilized to manage the state and backtracking of any program-flow variables and characteristics that may be local to a method invoked against a given Processable.

During the evaluation of one or more candidate options, backtracking process 10 may implement the backtracking logic flow via Processable objects of the Processable class. Each Processable type may be used to wrap one or more Validation class types. As described above, each Validation object may encapsulate the logic to be executed by the Validation-Processable packet (e.g., by the Validation object and associated Processable object), by which the one or more candidate options may be evaluated to determine if they provide a successful outcome (e.g., satisfy the logic) or a failed outcome (e.g., do not satisfy the logic). The Processable object that wraps the Validation object may encapsulate the backtracking logic in the event of a failed outcome, and/or the progression of the process to evaluate further candidate options (e.g., which may utilize different Validations-Processable packets for evaluating different decision points) in the event of a successful outcome at the current Validation-Processable packet. In some embodiments, more than one Processable object may wrap the same Validation object. Further, a Validation object may implement one or more hooks called by the Processable object(s) which wraps the Validation object.

When processed (e.g., for the evaluation of the one or more candidate options), a Processable object may manage pushing other Processable objects onto a Processable stack at appropriate timings. The Processable object may also pop the other Processable objects from the Processable stack, and call "process" on each of the other Processable objects on the Processable stack. As generally discussed above, the Processable object may also retain state changes that have been made to the system via the wrapped Validation. As such, the Processable object may also unroll such retained state changes if, and as, necessary (e.g., in the event of a failed outcome for an evaluated candidate option). Further, the Processable object may return a Boolean value of "true" if the evaluation is successful and a Boolean value of "false" if the evaluation is not successful. For example, if the Processable object represents a disjunctive logic flow, if one of the plurality of candidate options succeeds the validation logic the Processable object may return a Boolean true. However, if none of the plurality of candidate options succeeds the validation logic, the Processable object may return a Boolean false.

As generally discussed above, a Processable object may wrap a Validation object, and may, at least in part, represent the backtracking logic flow to be implemented for recursively evaluating candidate options against the validation logic. The type of Processable coupled with the Validation may define how Processable children will be managed within the process flow. For example, the Processable may determine how and when the Processable children (e.g., which may include any InitProcessables and/or PostProcessables) should be pushed onto a Processable stack (e.g., in a disjunctive manner, in a conjunctive manner, etc.) that is managed by the Processable object. InitProcessables and PostProcessables may facilitate encapsulation of logic associated with initializing, and post processing a child Processable within the parent Processable's Validation class. This may allow for a clearer organization when modeling a system being built. The type of Processable coupled with the Validation may also determine whether any child Processables should be scoped to their own Processable stack (e.g., a new Processable stack for the child Processables). The type of Processable coupled with the Validation may also determine whether unrolling of state changes made by the Validation need to consider only the current Processable, or whether one or more Processables previously executed on a scoped Processable stack should also be considered.

The Processable may determine how the Processable stack is managed. Accordingly, the type of Processable that is coupled with the Validation may determine, at least in part, how the Processable stack is managed. For example, the type of Processable coupled with the Validation may determine whether a new Processable stack is created for any child Processables that may be generated, or whether such child Processables are simply pushed onto the existing Processable stack.

The Processable type may also determined what methods may be called against the Validation that is coupled with the Processable. For example, the child Processable may be called against the Validation, and may execute "runLogic( )" against the Validation. Examples of the types of Processables that may call this method may include, but are not limited to, conjunction, disjunction, scoped backtracking disjunction, branch and bound disjunction, and the like. The type of Processable may also determine if an InitProcessable may be called against the Validation. In such an embodiment, the InitProcessable may execute "initProcess( )" against the Validation wrapped by the InitProcessable to allow initializations to occur prior to processing a chosen child Processable. The initProcess( ) hook may be called against the Validation that is wrapped by the Processable that generated the child Processable referenced. Further, the type of Processable may also determine if a PostProcessable may be called against the Validation. A PostProcessable may execute "postProcess( )" against the Validation wrapped by the Processable. The postProcess( ) hook may allow some post processing to occur after the processing of the chosen Processable child is complete. The postProcess( ) hook may be called against the Validation that is wrapped by the Processable that generated the Processable child. It will be appreciated that multiple child Processables may wrap the same Validation. In some instances more than one of the multiple child Processables that wrap the same Validation may include child Processables of the same type. As such, in some cases the Validation may be stateless, while in other cases the Validation may be stateful. It should be noted that, in some embodiments, while both the InitProcessable and the PostProcessable may wrap the Validation of the parent Processable, the chosen child Processable of the parent Processable may be initialized onto the InitProcessable and the PostProcessable in order for processing (e.g., initialization or post processing) to take place.

The Validation class may implement one or more predefined hooks. The Validation may be responsible for generating any Processable children (i.e., child Processable classes that may be implemented for evaluating the one or more candidate options). The Validation may further determine the type of child Processable that wraps the Validation. For example, depending upon the logic being implemented for evaluating candidate options, one or more types of Processables may wrap the Validation. Example types of child Processables that may wrap the Validation may include, but are not limited to, conjunction, disjunction, scoped backtracking disjunction, branch and bound disjunction, as well as other Processables (e.g., which may represent the backtracking logic to be implemented). The Validation may also determine if one or more InitProcessable and/or PostProcessable should be created to wrap (e.g., on the pStack) any Processable children that are generated. Further, the Validation may return a Boolean value from any defined hooks. The returned Boolean value may include a true value if the candidate option(s) satisfies the validation logic and may include a false value if the candidate option(s) do not satisfy the validation logic.

Figure 3:
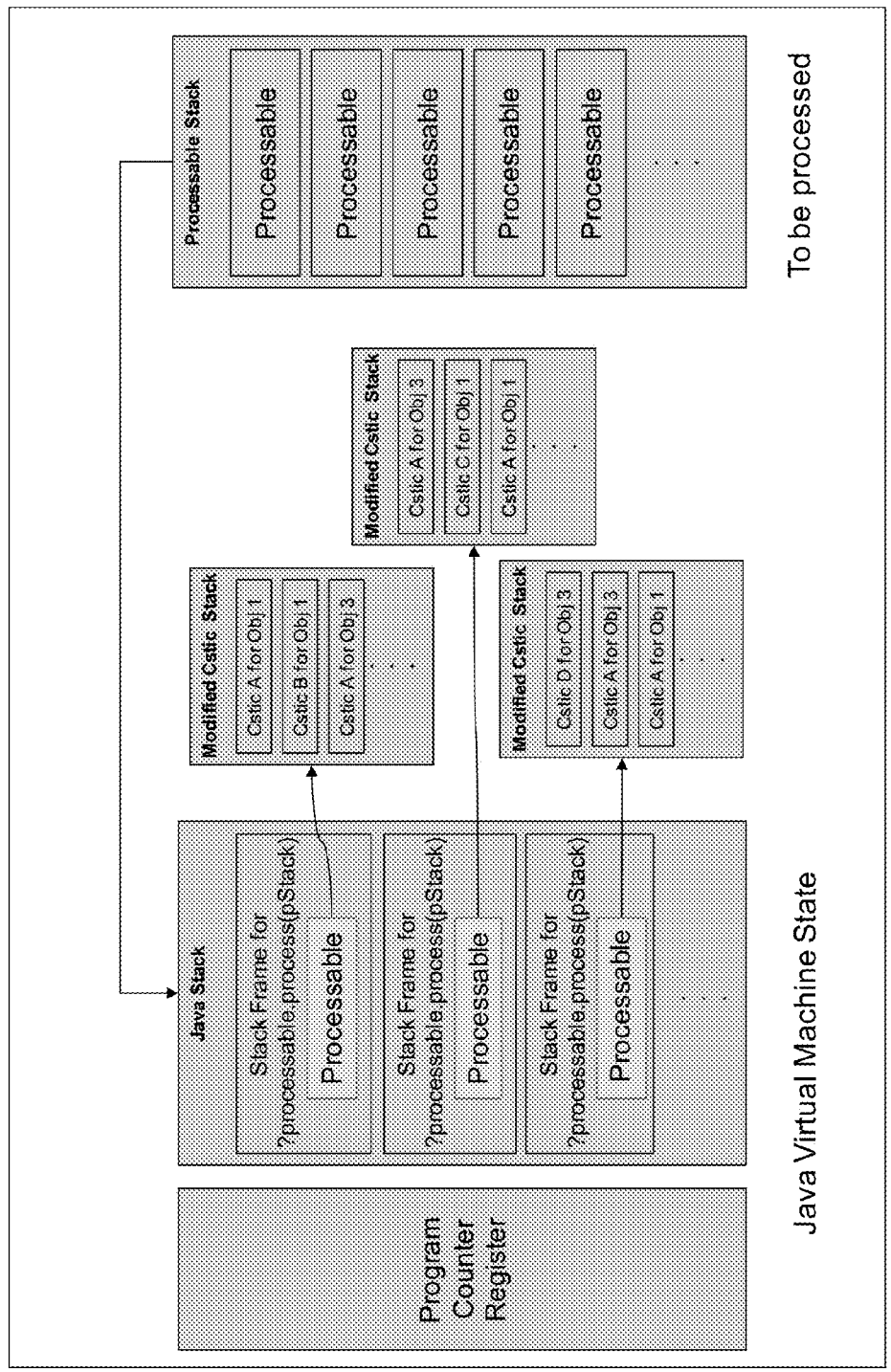
FIG. 3 diagrammatically depicts a Java Virtual Machine state according to an example embodiment.

Referring to FIGS. 3 through 12 illustrative example implementations of backtracking process 10 are shown. In an example embodiment, the Validation class and the Processable class may be defined using Java as a standard programming language. Consistent with such an implementation, FIG. 3 diagrammatically depicts a Java Virtual Machine state including the Java stack that may contain stack frames, one for each recursive call to the Processable.process( ) method. FIG. 3 may also diagrammatically depict the current Processable stack state. In general, the Processable objects referenced in each stack frame may hold reference to state changes that have been made during the processing of that Processable object. Note that while Processable instances in the Processable stack will not hold references to changed states yet, as each is processed (popped-off of the pStack and added to the Java Stack), each may hold references to changes that have occurred during the evolution of that Processable. In the event of a failure (e.g., a failure of a candidate option to satisfy a validation logic), whatever state changes have occurred can be unrolled.

Unprocessed Processable instances (e.g., Processable objects that have yet to be processed) may be pushed on to a "Processable Stack' (pStack) in the order in which they are to be processed (e.g., last in, first out). The pStack may in turn be passed as an argument in the "process" method in order to recursively pop and call the "process" method on each Processable instance. Each "process" method may instantiate and add 0-n Processable instances to the pStack. As each Processable instance is popped off of the pStack and "'process" called against the Processable instance, a Java Stack Frame may be added to the Java Frame Stack for that call. If a failure occurs (i.e., the "process" method returns false), stack frames may be popped from the Java Frame Stack and the Processable instance from that stack frame may be pushed back onto the pStack. In some implementations, as each Processable instance is pushed back onto the pStack, a "'revertState" method may be called on that Processable instance. The "revertState" method may remove any Processable instances that were previously added to the pStack by the "process'" method called on that Processable.

Each Processable instance may hold a reference to a "'Modified Cstic" stack (mCS). The mCS may hold references to various (0-n) characteristics that have been modified during the execution of the "'process" method for that Processable. Multiple references to the same characteristic within the same mCS may indicate that multiple changes to the same characteristic have occurred while processing the Processable. As mentioned above, when a "process" method returns false, the "revertState" method may be called on the Processable instance. Additionally, the "revertState'" method may undo any changes to characteristics that were made during the "process" method. A stack configuration for retaining reference to characteristics that have been modified during execution of the "process" method for a Processable is diagrammatically depicted.

Figure 4:
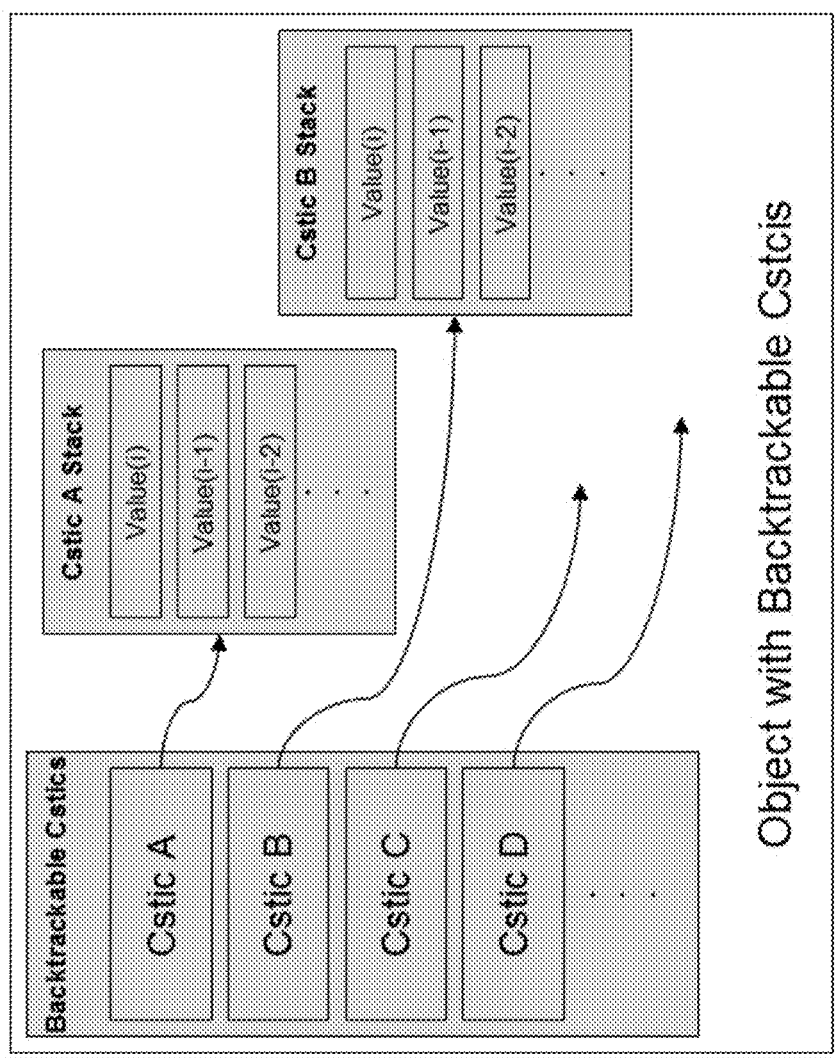
FIG. 4 diagrammatically depicts references to a set of backtrackable characteristics, each represented by a stack configuration retaining reference to the latest characteristic state and any previous state that has been modified during execution, according to an example embodiment.

Referring also to FIG. 4, in an implementation, any object that holds backtrackable cstics may hold a reference, either directly or via another object, to a "backtrackable Cstic" HashMap (BTCsticMap). The BTCsticMap may be set up such that the HashMap key is a String of the cstic name and the HashMap value is a stack. The top element on the stack may contain the current state of the cstic value. Each element below the top element may represent a value of the cstic from a previous state (full value or in some cases, a delta from the element immediately above). As such, the stack may contain the current state of the cstic value, as well as previous states of the cstic value.

Figure 5:
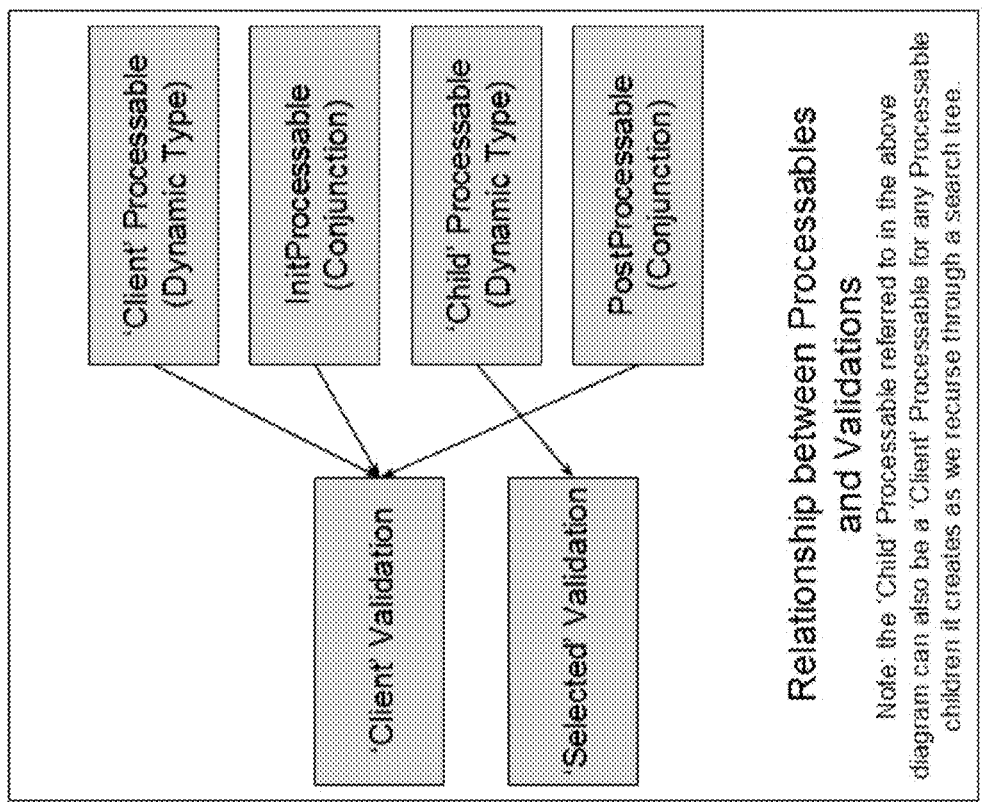
FIG. 5 diagrammatically depicts a relationship between a processable class and a Validation class according to an example embodiment.

Referring also to FIG. 5, the relationship between Processables and Validations is diagrammatically depicted, according to an example embodiment. In any problem that allows for backtracking, choices may be made during a search cycle, in an attempt to find a solution. Choices that can be backtracked to may be made at "choice points." Consistent with an example embodiment, once a choice is made within the "process" method for a Processable instance, any further backtrackable state changes cannot be made within the context of that Processable. This inability to make further backtrackable state changes may be due to the fact that all changes associated with a single Processable instance must be rolled back together as a group (e.g., in the event of backtracking to a choice point). As such, it may be necessary to instantiate a new Processable to record the state changes immediately after a choice point.

In an example embodiment, the logic associated with any Processable instance may be written against the paired Validation object. This may provide the ability to scope all logic associated with a particular operation (e.g., to link one object to another) with a single Validation class, but split that processing across multiple Processable instances. For example, a typical paradigm for "linkage" logic may be to:

a) filter and sort candidates, then choose a particular candidate;
b) initialize the selected candidate;
c) validate the selected candidate; and
d) post process the selected candidate.

Consistent with the this example, a) filtering and sorting candidates, and choosing a particular candidate; b) initializing the selected candidate; and d) post processing the selected candidate may include logic associated with forming a "linkage," and all may be written against a single Validation class. In such an embodiment a) selecting and sorting candidates, and choosing a particular candidate; b) initializing the selected candidate; and d) post processing the selected candidate may all include separate methods written against the single Validation class. Additionally, with the placement of the processables on the pStack, it may be important that the Processable instances be placed in the order as shown.

Figure 6:
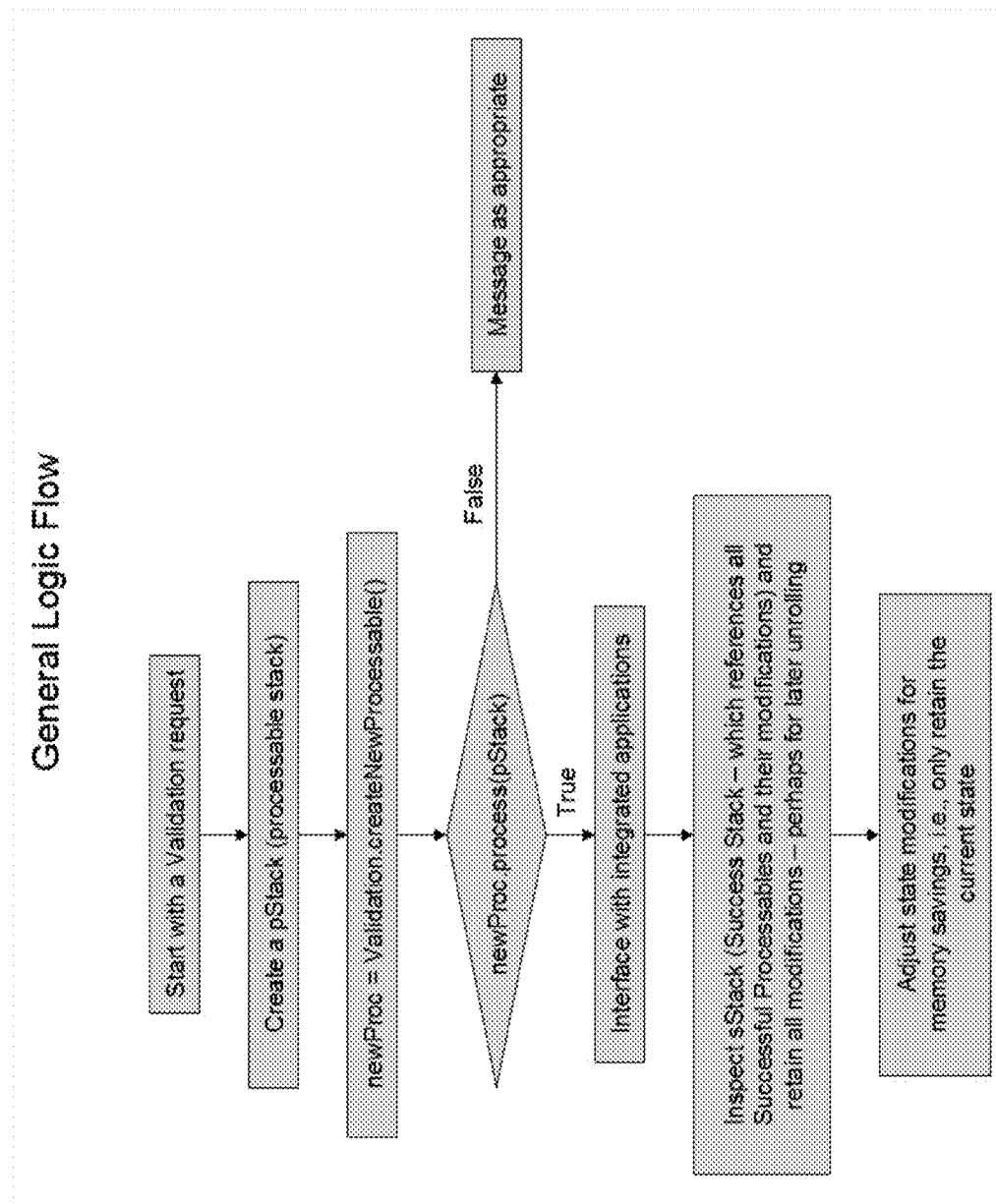
FIG. 6 is a flowchart of a general logic flow of the backtracking process of FIG. 1 according to an example embodiment.

Referring to FIG. 6 a general logic flow consistent with an example embodiment of backtracking process 10 is illustrated. As depicted, one or more Validations can be requested, each wrapped in a Processable, which may in turn be added to a new pStack. The top Processable instance may be popped from the pStack and the "process'" method may be called, passing the pStack as an argument. Each Processable instance that is processed may in turn add more Processable instances to the pStack. Ultimately, the first process method may return true or false, and based on that, the program will react appropriately.

The "success stack" (sStack), which may contain all of the Processable instances that were processed as part of the successful search may be inspected/retained as needed. Characteristics in any BTCsticMaps modified during the successful processing may be cleaned so that only the top value remains. The procedure illustrated with respect to FIG. 6 can be repeated as needed, i.e., other Validations may be requested to further adjust a system state.

Figure 7:
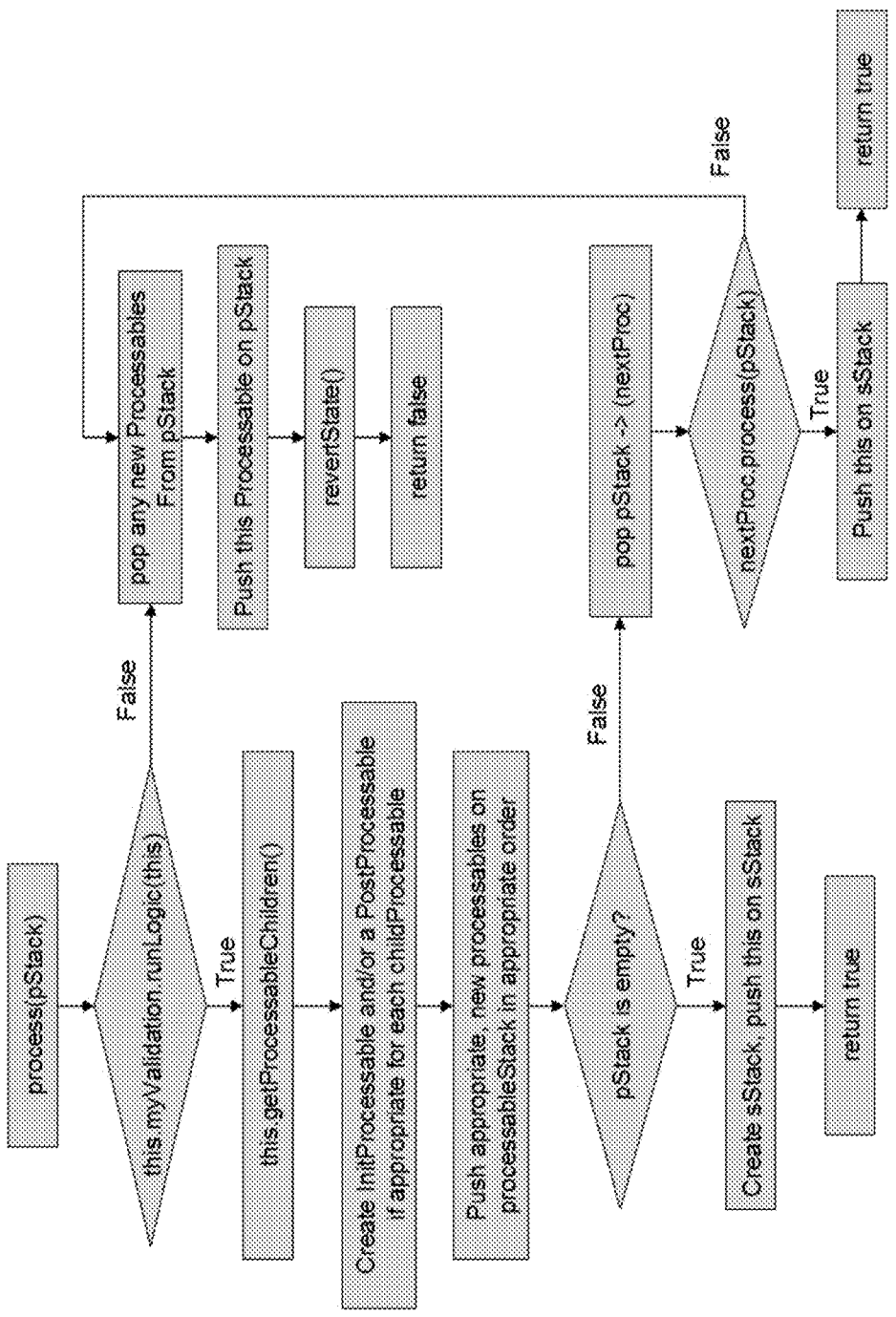
FIG. 7 is a flowchart of the backtracking process of FIG. 1 implementing a conjunction processable logic flow according to an example embodiment.

A general backtracking logic flow that may be implemented in connection with a conjunction Processable (i.e., a Processable implementing a conjunction backtracking logic) is generally shown in FIG. 7. The logic of the Processable may be executed, e.g., with the method "runLogic" being called against the Validation instance paired with the conjunction Processable. Any Processable "children" (i.e., any new Processable instances) may be determined and instantiated. In an example embodiment the determination and instantiation of Processable children may be done in the method "runLogic." This may be accomplished by identifying the desired Validation children (e.g., which may include filtering and sorting as appropriate), and then instantiating a Processable instance for each of the Validation children. As generally discussed above, the Validation may determine which type of Processable to instantiate. Additionally, any InitProcessables and/or PostProcessables may be determined and instantiated for each Processable child instance if the paired Validation instance indicates to do so.

All Processable children instances may be pushed onto the pStack (e.g., Conjunction==AND) with an InitProcessable instance above and a PostProcessable instance below each child as appropriate. If the pStack has >0 entries, the top Processable instance may be popped from the pStack and "process" method may be called on the Processable instance. If not (i.e., if the pStack has <1 entries) this Conjunction may be pushed on the sStack and a Boolean value of True may be returned. If a value of True is returned from "'process" method, this Conjunction instance may be pushed onto the sStack and a True value may be returned. If a False value is returned from "process" method, any Processable instances that were added to the pStack by this Conjunction instance may be removed, and the "revertState" method may be run to undo changes made to the system state during the processing of this Conjunction instance. This Conjunction instance may be pushed onto the pStack and a value of False may be returned.

Figure 8:
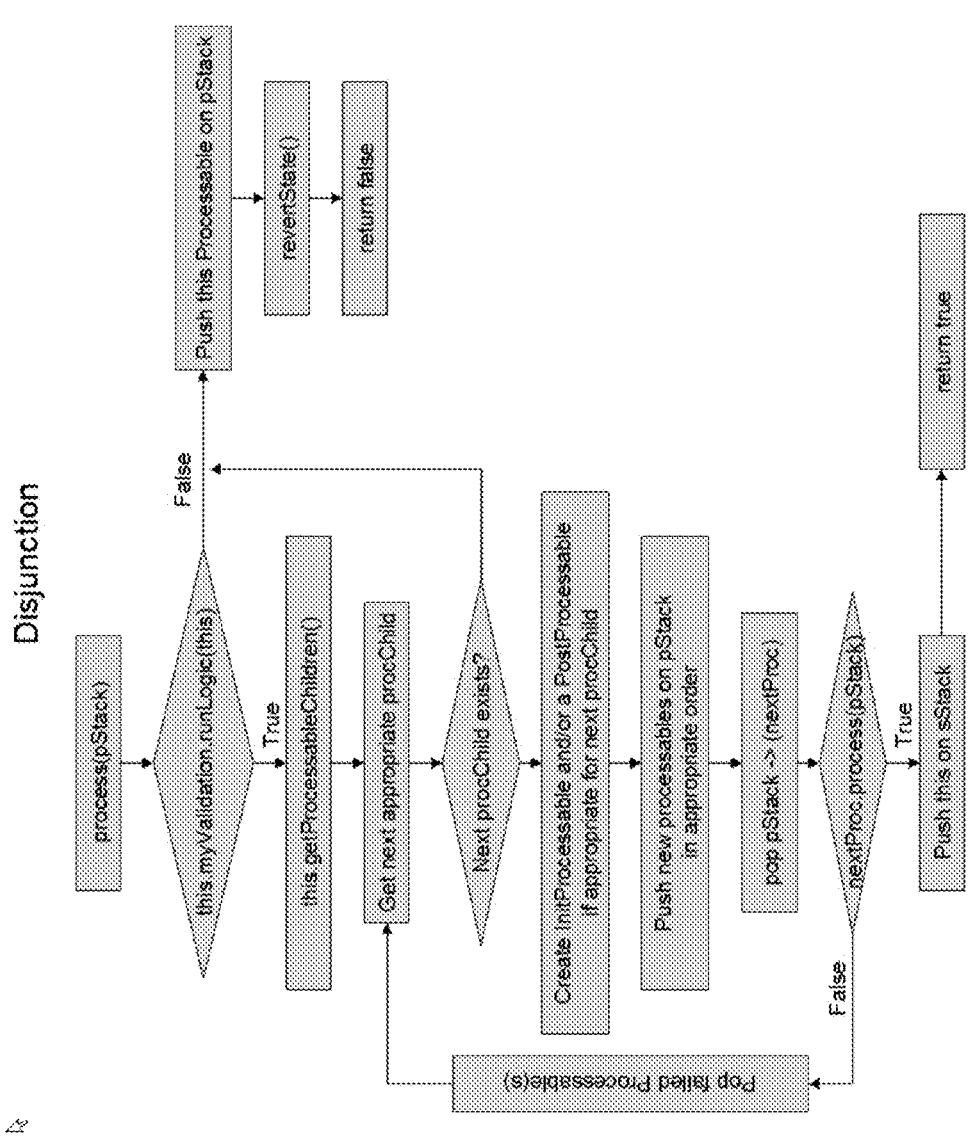
FIG. 8 is a flowchart of the backtracking process of FIG. 1 implementing a disjunction processable logic flow according to an example embodiment.

Referring to FIG. 8, a flowchart of an example disjunction Processable logic flow is shown. As shown, the logic of the disjunction Processable may be executed, e.g., calling the method "runLogic" against the disjunction Processable's paired Validation instance. The Processable "children," (i.e., any new Processable instances) may be determined and instantiated. In an example embodiment, determining and instantiating Processable children may be done in method "runLogic." Determining and instantiating the Processable children may be accomplished by identifying the desired Validation children (e.g., which may include filtering and sorting as appropriate), and then instantiating a Processable instance for each of the Validation children. As discussed above, the Validation may determine which type of Processable to instantiate.

The disjunction Processable may iterate through the Processable children, attempting to find one that will be successfully processed (Disjunction==OR). Any InitProcessable and/or PostProcessable for the current Processable child instance may be determined and instantiated if the paired Validation instance indicates to do so. Additionally, the current Processable child instance may be pushed onto the pStack with an InitProcessable instance above it and a PostProcessable instance below it as appropriate. The top Processable instance may be popped from the pStack and "process" method may be called on it. If True is returned from "process" method, the iteration may be stopped, and this disjunction Processable instance may be pushed onto the sStack and True may be returned. If False is returned from "process" method, any Processable children added to the pStack during this iteration may be removed, and iterating through Processable children may continue. If the iteration completes (i.e., with no success for any children), the "revertState" method may be run to undo changes made to the system state during the processing of this Disjunction instance. This disjunction Processable may be pushed onto the pStack and False may be returned.

Figure 9:
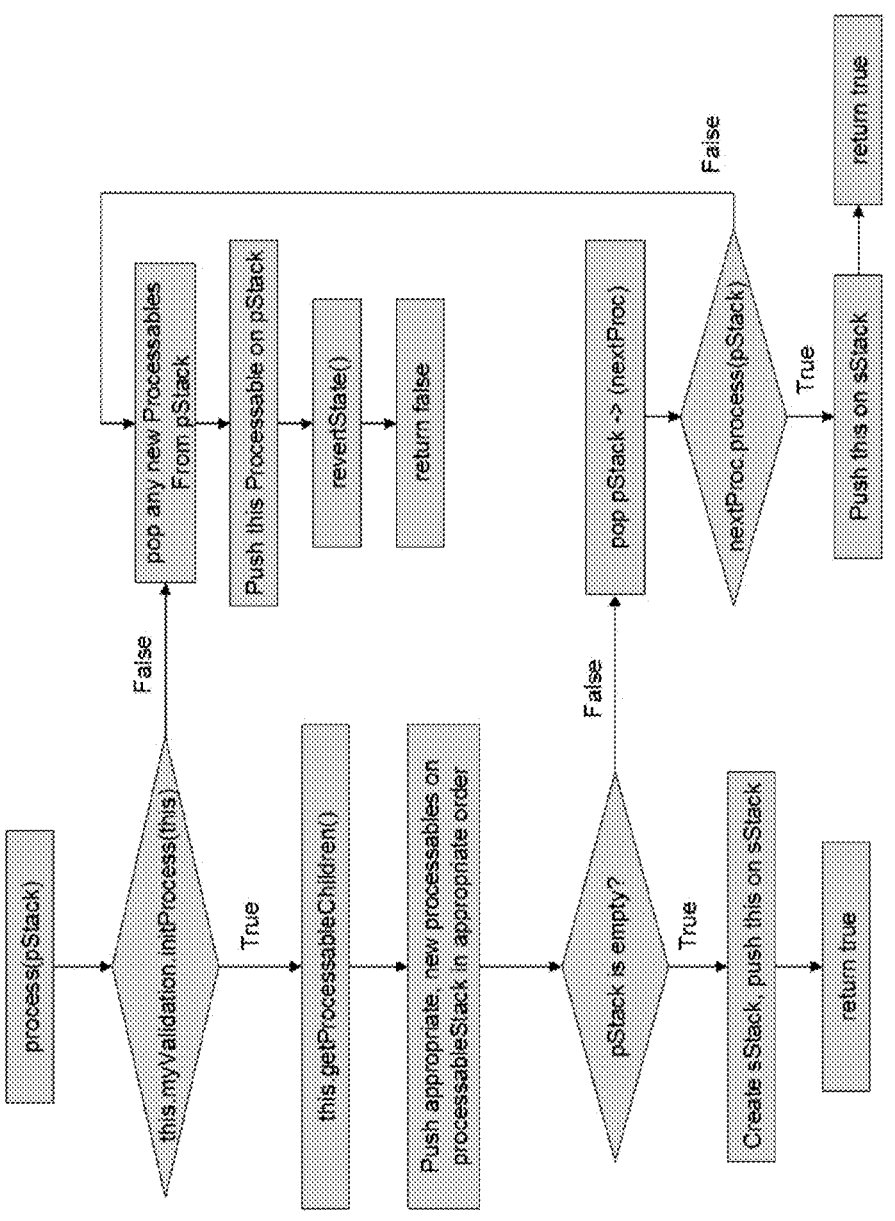
FIG. 9 is a flowchart of a logic flow associated with an InitProcessable according to an example embodiment.

An example logic flow associated with an InitProcessable is shown in FIG. 9. The InitProcessable logic may be executed, e.g., by calling the method "initProcess" against the Validation instance paired with the InitProcessable. It should be noted that, in some embodiments, the Processable instance that this InitProcessable instance is associated with (i.e., the "selected Processable") may have been initialized on a field of the InitProcessable instance. Any Processable "children" (i.e., any new Processable instances) may be determined and instantiated. Determining and instantiating Processable children may, in some embodiments, be done in method "initProcess." This may be done by identifying the desired Validation children (e.g., which may include filtering and sorting as appropriate) and then instantiating a Processable instance for each of the Validation children. As discussed above, the Validation may determine which type of Processable to instantiate.

All of the Processable children instances may be pushed onto the pStack (InitProcessable==Conjunction==AND). If the pStack has >0 entries, the top Processable instance may be popped from the pStack and the "process" method may be called on the popped Processable instance. If not (e.g., if the pStack has <1 entries), this InitProcessable may be pushed on the sStack and a True may be returned. If True is returned from the "process" method, this InitProcessable instance may be pushed onto the sStack and return True. If False is returned from the "process" method, any Processable instances that were added to the pStack by this InitProcessable instance may be removed, and the "revertState" method may be run to undo changes made to the system state during the processing of this InitProcessable instance. Further, this InitProcessable instance may be pushed onto the pStack and a False may be returned.

Figure 10:
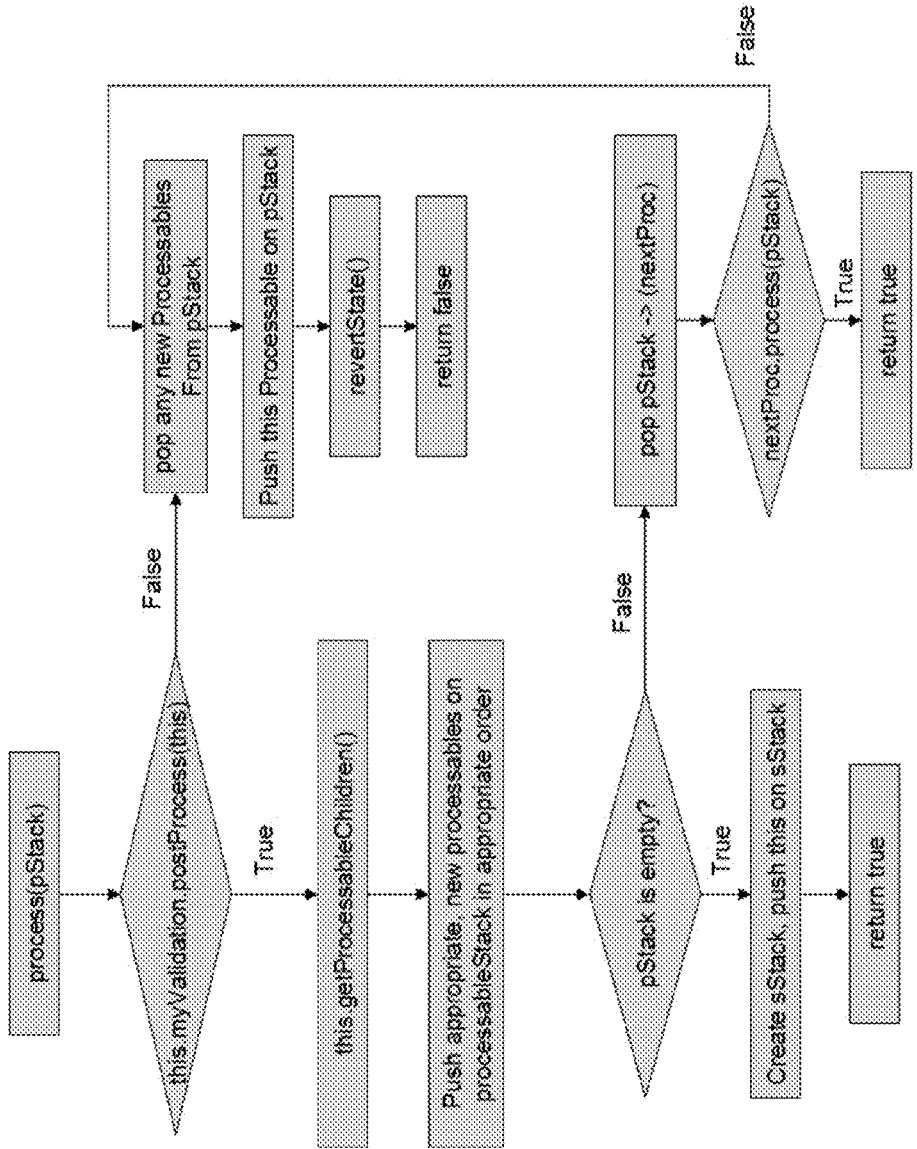
FIG. 10 is a flowchart of a logic flow associated with a PostProcessable according to an example embodiment.

Referring to FIG. 10, an example logic flow associated with a PostProcessable is shown. The PostProcessable logic may be executed, including calling the method "postProcess" against the PostProcessable's paired Validation instance. It should be noted that, in some embodiments, the Processable instance that this PostProcessable instance is associated with (i.e., the "selected Processable") may have been initialized on a field of the PostProcessable instance. Any Processable "children" (i.e., any new Processable instances) may be determined and instantiated. In some embodiments, determining and instantiating any new Processable children may be done in the method "postProcess." In an embodiment, determining and instantiating any new Processable children may include identifying the desired Validation children (e.g., which may include filtering and sorting as appropriate), and then instantiating a Processable instance for each of the Validation children. As discussed above, the Validation may determine which type of Processable to instantiate.

The Processable children instances may be pushed onto the pStack (PostProcessable==Conjunction==AND). If the pStack has >0 entries, the top Processable instance may be popped from the pStack, and the "'process" method may be called on the popped Processable instance. If the pStack has <1 entries, this PostProcessable may be pushed on the sStack and a True may be returned. If True is returned from the "process" method, this PostProcessable instance may be pushed onto the sStack and a True may be returned. If a False is returned from "process" method, any Processable instances that were added to the pStack by this PostProcessable instance may be removed, and the "revertState" method may be run to undo changes made to the system state during the processing of this PostProcessable instance. This PostProcessable instance may be pushed onto the pStack and a False may be returned.

Figure 11:
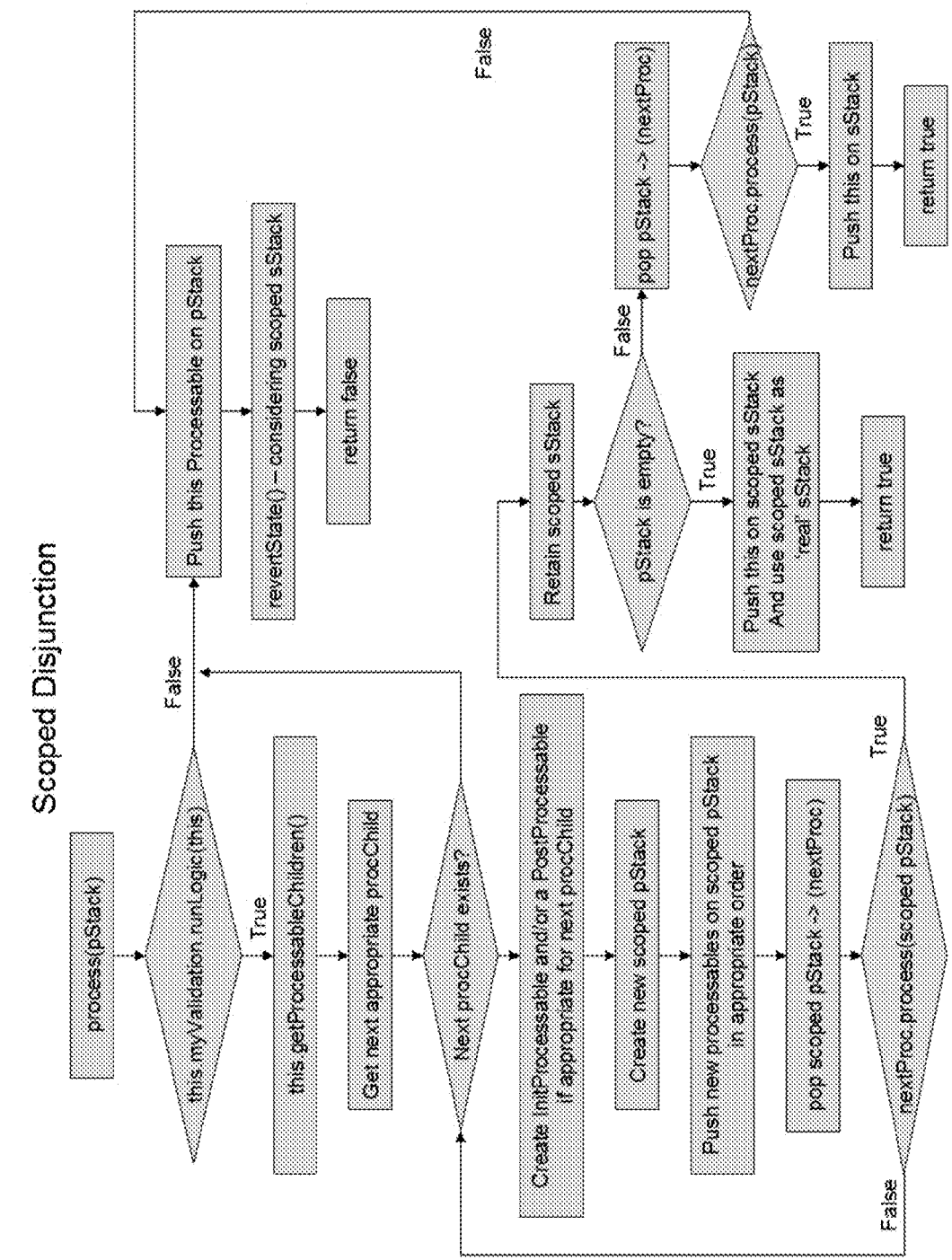
FIG. 11 is a flowchart of the backtracking process of FIG. 1 implementing a scoped disjunction processable logic flow according to an example embodiment.

Referring to FIG. 11, an example logic flow associated with a scoped disjunction Processable is shown. The logic of the scoped disjunction Processable may be executed, including calling the method "runLogic" against the Validation instance paired with the scoped disjunction Processable. Any Processable "children" (i.e., any new Processable instances) may be determined and instantiated. Determining and instantiating Processable children may, in some embodiments, be done in method "runLogic." Determining and instantiating Processable children may include identifying the desired Validation children (e.g., which may include filtering and sorting as appropriate), and then instantiating a Processable instance for each of the Validation children. As discussed above, the Validation may determine which type of Processable to instantiate.

The scoped disjunction Processable may iterate through the Processable children, attempting to find one that will be successfully processed (ScopedDisjunction==Disjunction==OR). If the paired Validation instance indicates to do so, any InitProcessables and/or PostProcessables for the current Processable child instance may be determined and instantiated. The scoped disjunction Processable may instantiate a new pStack and a new sStack. The current Processable child instance may be pushed onto a new pStack, with an InitProcessable instance above and a PostProcessable instance below the current Processable child instance, as appropriate. The top Processable instance may be popped from the new pStack, and the "process" method may be call on it (e.g., which may include passing the new pStack and new sStack). If False is returned from the "process" method, the scoped disjunction Processable may continue iterating through Processable children. If iteration completes (i.e., with no success with any children) the "revertState" method may run to undo changes made to the system state during the processing of this scoped disjunction Processable instance. It should be noted that, in some embodiments, no new Processable instances would have been added to the passed pStack, so none would need removal. Further, this scoped disjunction Processable may be pushed on to the pStack, and a False may be returned.

If True is returned from the "process" method, the iteration may be stopped. If the passed pStack has >0 entries, the top Processable instance may be popped from the pStack, and the "process" method may be called on top Processable instance. If the passed pStack has <1 entries, the new sStack may be pushed onto the passed sStack along with this scoped disjunction Processable, and True may be returned. If True is returned from the "process" method, the new sStack may be pushed onto the passed sStack along with this scoped disjunction Processable, and a True may be returned. If False is returned from the "process method" the scoped disjunction Processable may iterate through the new sStack, and may run the "revertState" on each entry (in appropriate order) to undo changes made to the system state during the processing of the new pStack. Also "revertState" may be run on this scoped disjunction Processable to undo changes made to the system state during the processing of this scoped disjunction Processable. Further, this scoped disjunction Processable instance may be pushed onto the pStack and a False may be returned.

Figure 12:
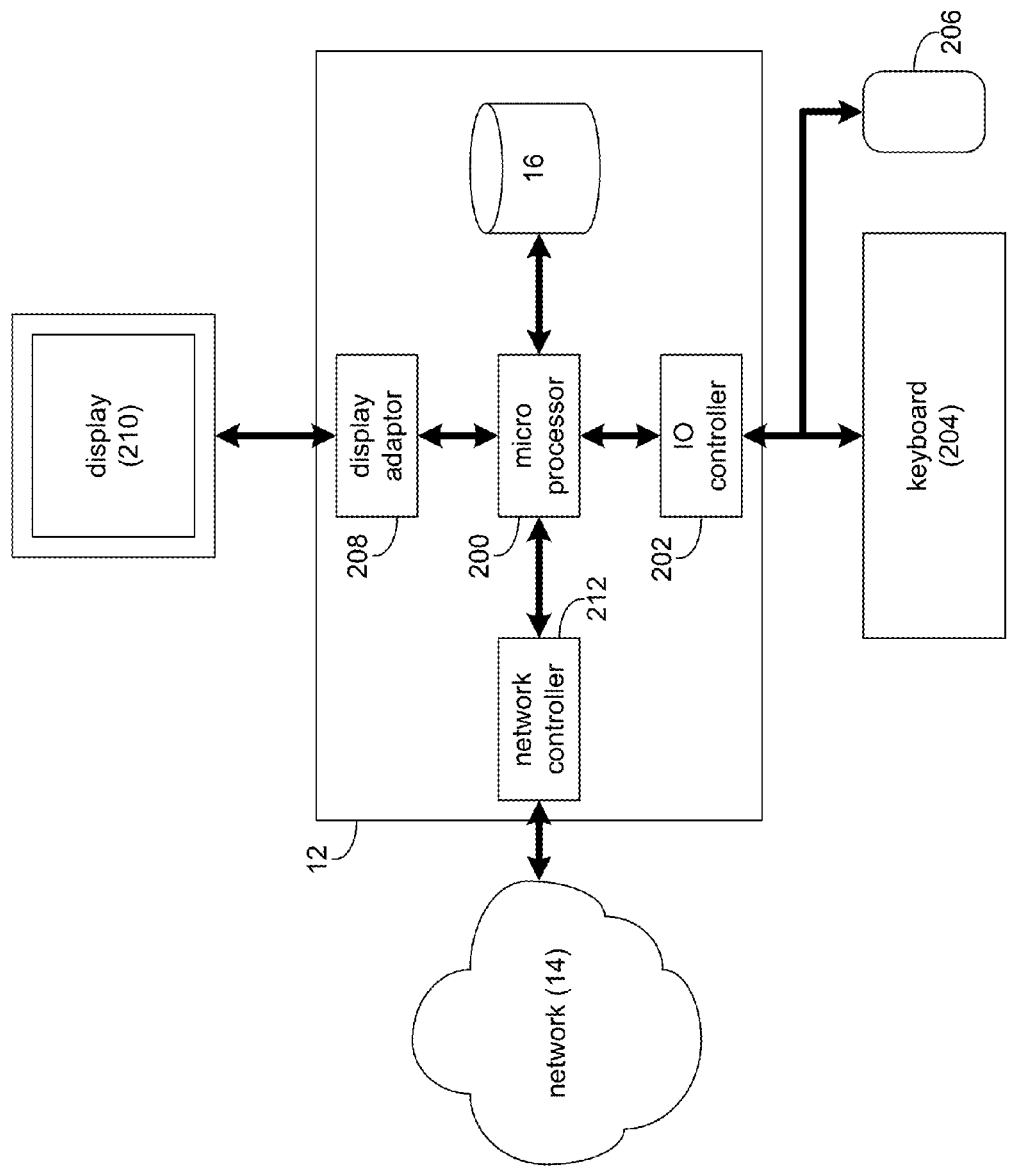
FIG. 12 is a diagrammatic view of the computing device of FIG. 1, according to an implementation of the present disclosure.

Referring also to FIG. 12, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, quality of backtracking process 10 may be substituted for computing device 12 within FIG. 12, examples of which may include but are not limited to client electronic devices 28, 30, 32, 34.

Computing system 12 may include microprocessor 200 configured to e.g., process data and execute instructions/code for backtracking process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
defining, by a processor, a validation class representing a validation logic to be tested;
defining, by the processor, a processable class representing a backtracking logic flow to be implemented, wherein the backtracking logic flow is maintained separately from the validation logic, wherein the processable class defines logic for managing state changes during execution of a backtracking algorithm;
associating, by the processor, the processable class with the validation class, wherein associating the processable class with the validation class includes executing logic referencing a processable child one of prior to executing logic against the processable child and after executing logic against the processable child, the logic defined against the validation class, wherein the logic to select, initialize, and post process the processable child is written on a single validation class; and
evaluating, by the processor, one or more candidate options based upon, at least in part, the validation logic and the backtracking logic flow, wherein evaluating the one or more candidate options includes implementing the backtracking logic flow via one or more processable objects of the processable class, wherein each of the one or more processable objects wraps each of one or more validation objects that encapsulate the logic to be executed by a validation-processable packet, wherein, in the event of a failed candidate option, evaluating the one or more candidate options includes at least one of saving a number of references to the state changes occurring during execution of the validation logic, unrolling the state changes resulting from execution of the validation logic to discard the failed candidate option from the one or more candidate options, and selecting a new candidate option consistent with the validation logic.

2. The computer-implemented method of claim 1, wherein defining the validation class includes defining the validation class using syntax and libraries of a standard programming language, and defining the processable class includes defining the processable class using syntax and libraries of a standard programming language.

3. The computer-implemented method of claim 1, wherein the backtracking logic flow includes one or more of a conjunction logic flow, a disjunction logic flow, a scoped disjunction logic flow, and a branch and bound backtracking logic flow.

4. The computer-implemented method of claim 1, wherein associating the processable class with the validation class includes dynamically associating the processable class with the validation class at runtime.

5. The computer-implemented method of claim 1, wherein associating the processable class with the validation class includes selecting the processable class from a plurality of processable classes, the plurality of processable classes representing a plurality of backtracking logic flows.

6. A computer program product comprising a non-transitory computer readable storage medium having a plurality of instructions stored thereon, which, when executed by a processor, cause the processor to perform operations including:

defining a validation class representing a validation logic to be tested;

defining a processable class representing a backtracking logic flow to be implemented, wherein the backtracking logic flow is maintained separately from the validation logic, wherein the processable class defines logic for managing state changes during execution of a backtracking algorithm;

associating the processable class with the validation class, wherein associating the processable class with the validation class includes executing logic referencing a processable child one of prior to executing logic against the processable child and after executing logic against the processable child, the logic defined against the validation class, wherein the logic to select, initialize, and post process the processable child is written on a single validation class; and evaluating one or more candidate options based upon, at least in part, the validation logic and the backtracking logic flow, wherein evaluating the one or more candidate options includes implementing the backtracking logic flow via one or more processable objects of the processable class, wherein each of the one or more processable objects wraps each of one or more validation objects that encapsulate the logic to be executed by a validation-processable packet, wherein, in the event of a failed candidate option, evaluating the one or more candidate options includes at least one of saving a number of references to the state changes occurring during execution of the validation logic, unrolling the state changes resulting from execution of the validation logic to discard the failed candidate option from the one or more candidate options, and selecting a new candidate option consistent with the validation logic.

7. The computer program product of claim 6, wherein the defining the validation class includes defining the validation class using syntax and libraries of a standard programming language, and wherein defining the processable class includes defining the processable class using syntax and libraries of a standard programming language.

8. The computer program product of claim 6, wherein the backtracking logic flow includes one or more of a conjunction logic flow, a disjunction logic flow, a scoped disjunction logic flow, and a branch and bound backtracking logic flow.

9. The computer program product of claim 6, wherein associating the processable class with the validation class includes dynamically associating the processable class with the validation class at runtime.

10. The computer program product of claim 6, wherein associating the processable class with the validation class includes selecting the processable class from a plurality of processable classes, the plurality of processable classes representing a plurality of backtracking logic flows.

11. A computing system comprising:

a processor and a memory module coupled with the processor, the processor being configured for:

defining a validation class representing a validation logic to be tested;

defining a processable class representing a backtracking logic flow to be implemented, wherein the backtracking logic flow is maintained separately from the validation logic, wherein the processable class defines logic for managing state changes during execution of a backtracking algorithm;

associating the processable class with the validation class, wherein associating the processable class with the validation class includes executing logic referencing a processable child one of prior to executing logic against the processable child and after executing logic against the processable child, the logic defined against the validation class, wherein the logic to select, initialize, and post process the processable child is written on a single validation class; and evaluating one or more candidate options based upon, at least in part, the validation logic and the backtracking logic flow, wherein evaluating the one or more candidate options includes implementing the backtracking logic flow via one or more processable objects of the processable class, wherein each of the one or more processable objects wraps each of one or more validation objects that encapsulate the logic to be executed by a validation-processable packet, wherein, in the event of a failed candidate option, evaluating the one or more candidate options includes at least one of saving a number of references to the state changes occurring during execution of the validation logic, unrolling the state changes resulting from execution of the validation logic to discard the failed candidate option from the one or more candidate options, and selecting a new candidate option consistent with the validation logic.

12. The computing system of claim 11, wherein the defining the validation class includes defining the validation class using syntax and libraries of a standard programming language, and wherein defining the processable class includes defining the processable class using syntax and libraries of a standard programming language.

13. The computing system of claim 11, wherein the backtracking logic flow includes one or more of a conjunction logic flow, a disjunction logic flow, a scoped disjunction logic flow, and a branch and bound backtracking logic flow.

14. The computing system of claim 11, wherein associating the processable class with the validation class includes dynamically associating the processable class with the validation class at runtime.

* * * * *